April 13, 1965 J. R. REESE 3,177,891
BULK LOADING VALVE AND CONTROL MEANS THEREFOR
Filed Nov. 17, 1961 5 Sheets-Sheet 1

INVENTOR.
James Robert Reese
BY
Bacon & Thomas
ATTORNEYS

April 13, 1965 J. R. REESE 3,177,891
BULK LOADING VALVE AND CONTROL MEANS THEREFOR
Filed Nov. 17, 1961 5 Sheets-Sheet 3

INVENTOR.
James Robert Reese
BY
Bacon & Thomas
ATTORNEYS

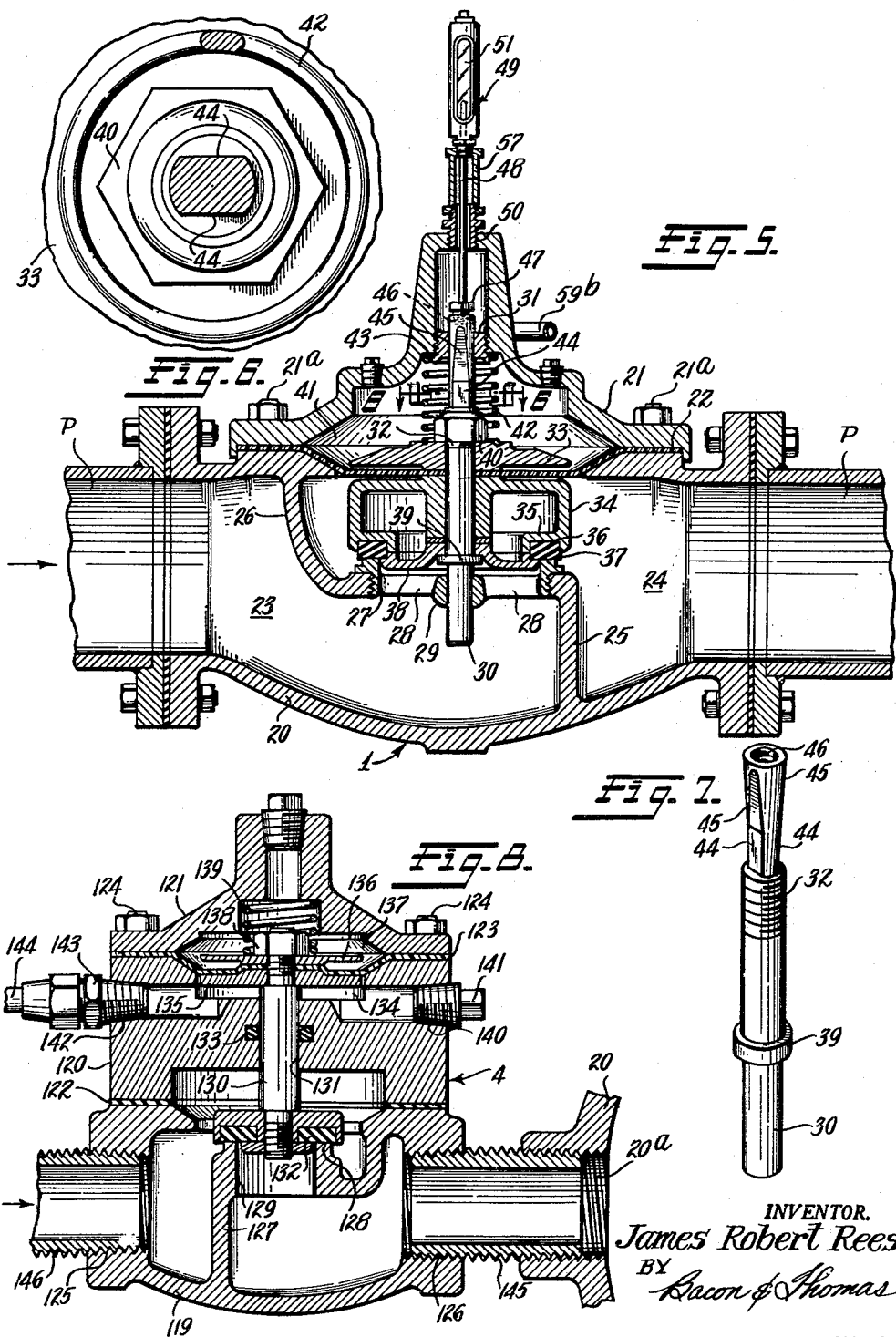

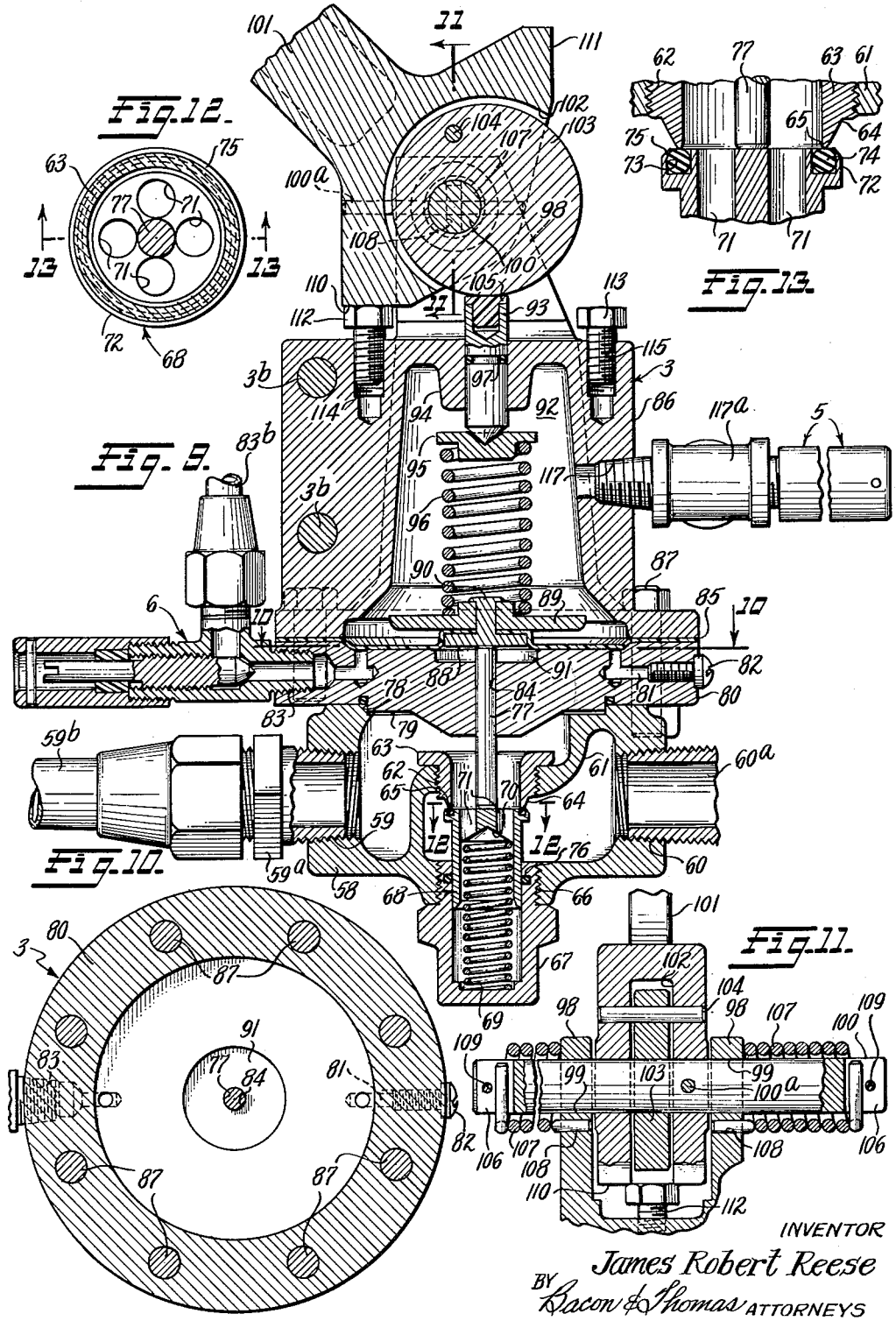

United States Patent Office 3,177,891
Patented Apr. 13, 1965

3,177,891
BULK LOADING VALVE AND CONTROL
MEANS THEREFOR
James Robert Reese, Santa Ana, Calif., assignor to Donald
G. Griswold, Newport Beach, Calif.
Filed Nov. 17, 1961, Ser. No. 153,182
23 Claims. (Cl. 137—495)

The present invention relates to a valve and control means therefor that will provide a safe, economical and easily operated system for dispensing fuel or other liquids. More particularly, the invention relates to a valve and control means associated therewith for bulk-loading fuel into tank trucks and the like.

The present valve and its control means represent a very compact and simplified construction that performs functions heretofore requiring two or three main valves.

One of the principal features of the present main valve and control means is that the main valve can be closed or conditioned for opening, by operating a switch that controls an operating-fluid bleeder valve from a remote location, or be opened and closed through a lanyard-actuated, operating-fluid control valve. The latter control valve is also responsive to differential pressure at a selected sensing point to automatically maintain a uniform rate of flow through the main valve corresponding to that determined by the lanyard-operation of the control valve.

A further feature of the present main valve is that the lanyard may be used to not only control the opening of the main valve, but to also control its closing, vary the maximum flow rate through the valve, and closely control the more or less trickle flow during "topping off" of the tank as the last few gallons are being added to fill the tank. The lanyard control is also such as to provide a "dead man shut-off," whereby release of the lanyard for any reason will automatically result in closing of the main valve. The remote switch in the control system can be actuated to effect closing of the main valve, if desired, independently of the lanyard control.

The main valve is of the pressure responsive diaphragm-operated type and is controlled by varying the pressure of the fluid in the diaphragm chamber supplied from the valve inlet. While the main valve is open, operating fluid is continuously bled from the diaphragm chamber and returned to the valve outlet. Such flow of operating fluid occurs through the combined lanyard-operated, and pressure differential operated, control valve, and through the solenoid-controlled bleeder valve, which is connected in series with the pressure differential operated valve.

Refinements in the operation of the main valve may be effected by lanyard control to provide the desired operation at flow rates that are too low to provide control through the sensing point pressure differential. On the other hand, if the differential pressure produced in the sensing lines is too high to insure a desired uniform, maximum flow rate, the effective differential pressure may be reduced by adjusting a "trim" needle valve connected in the control system, until the flow rate desired is reached. Due to the size and length of the sensing lines, pulsations may occur in certain installations. In order to overcome this problem, the control system also has connected therein a "dampening" valve that can be adjusted to obtain a maximum dampening effect.

The main valve also embodies a novel valve stem construction which checks the closing speed of the main valve by restricting the rate of flow of operating fluid to the diaphragm chamber. The effect of this action of the valve stem is to dampen any closing surges that may occur as the main valve is about to fully close.

The principal object of the invention is to provide a main valve and control system therefor that is particularly useful for bulk-loading of liquids into tanks and the like.

Another object is to provide a main valve and control system that will insure an environment of maximum safety when used in connection with the dispensing of inflammable liquids.

Another object is to provide a main valve and control means that can be actuated from a remote point to control the opening and/or closing of the main valve, and which can also be operated from a remote point to vary the rate of flow through the main valve.

Another object is to provide a main valve having control means including a pressure-differential-operated control valve, and means for compensating for excess differential pressure to insure the maintenance of a desired uniform flow rate.

A further object is to provide control means for a main valve, including an operating-fluid control valve that can be manually operated by a lever connected with a lanyard, and which control valve is also responsive to the pressure differential at a selected point on the inlet side of the main valve for maintaining a constant flow rate corresponding to the position of the lever determined by the pull on the lanyard.

A further object is to provide a control system for a main valve of the type described above, but including means operable to close the main valve independently of the lanyard control and/or the pressure-responsive control.

Another object is to provide a main valve and control system that will stabilize the main valve at low flow rates, which are normally critical and difficult to maintain.

A still further object is to provide control means for a main valve that can be adjusted to limit the maximum flow rate through the main valve.

A still further object is to provide a control system for a main valve including an operating-fluid bleeder valve, whereby the main valve is caused to close as the result of the actuation of said bleeder valve by a source of pressure independent of the pressure of the liquid being handled by the main valve.

Still another object is to provid a main valve, as described above, wherein rapid closing can be effected by either releasing the lanyard, or by the closing of the bleeder valve, but wherein the final closing speed of the main valve is automatically checked to dampen out any closing surges.

A still further object is to provide a main valve and control means, whereby the main valve can be caused to provide the same rate of flow for a given angular movement of the lanyard-operated control lever.

A still further object is to provide control means for a main valve, including a "dead man shut-off" that will automatically effect closing of the main valve upon release of the lanyard.

Other objects and features of the invention will be apparent from the following description taken in conjunction with the accompanying drawings, wherein:

FIG. 5 is a vertical sectional view through the main valve taken on the line 5—5 of FIG. 3;

FIG. 6 is an enlarged horizontal sectional view through the valve stem taken on the line 6—6 of FIG. 5;

FIG. 7 is a perspective view of the valve stem, particularly showing the relieved portions provided for dampening the closing action of the main valve;

FIG. 8 is a vertical sectional view through the operating-fluid bleeder-control valve taken on the line 8—8 of FIG. 2;

FIG. 9 is a vertical sectional view through the combined pressure differential and lanyard-operated control valve taken on the line 9—9 of FIG. 3;

FIG. 10 is a horizontal sectional view taken on the line 10—10 of FIG. 9;

FIG. 11 is a fragmentary vertical sectional view through the control lever taken on the line 11—11 of FIG. 9;

FIG. 12 is an enlarged horizontal sectional view taken on the line 12—12 of FIG. 9, particularly showing the passages formed in the valve disc for balancing the pressure thereon; and FIG. 13 is an enlarged fragmentary vertical sectional view taken on the line 13—13 of FIG. 12, showing the details of the valve seat, and sealing ring of the valve disc.

Figure 1:
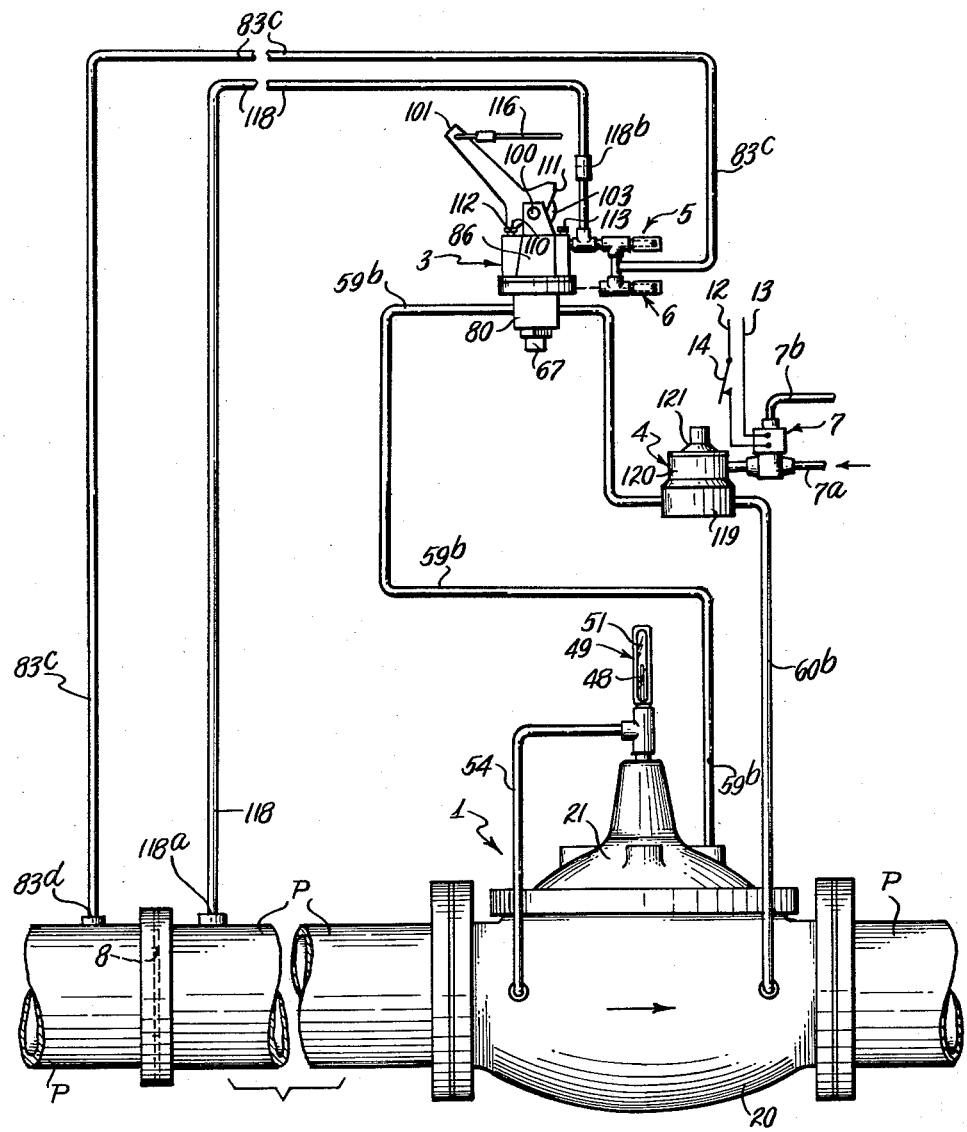
FIG. 1 is a diagrammatic view illustrating a pipe line wth the main valve and control system of the present invention connected therewith.

Referring to FIG. 1 of the drawings, the main valve is identified by the numeral 1 and is adapted to be connected in pipeline P. The discharge from the pipeline P may eventually pass through a loading arm (not shown) when the present apparatus is used to fill tank trucks or other equipment in which it is desired to bulkload gasoline, fuel oil or any other liquid. A valve control system is connected with the main valve 1 and pipeline P, and includes a combined, manual and pressure-differential-operated control valve 3, an operating-fluid bleeder-control valve 4, a needle type "trim" valve 5, a needle type "dampening" valve 6, and a 3-way, solenoid-operated valve 7 arranged to control the bleeder valve 4.

The control valves 3 and 4 are connected in series and control the rate of exhaust of operating fluid from the pressure chamber to the outlet of the main valve, as will be explained hereinafter. An orifice plate 8 is mounted in the pipeline P up stream of the main valve 1, and the pressure differential across the orifice plate is communicated to the control valve 3 in a manner which will be described later.

While an orifice plate 8 has been described as connected in the pipeline P, it will be understood that a flow meter may be substituted therefor, and that all functional operations, described hereinafter with respect to the differential pressure across the orifice plate, are likewise effected when a meter is used in lieu of the orifice plate. Accordingly, the words "orifice plate" may be read as "a meter" wherever they occur hereinafter.

Electrical current for energizing the solenoid valve 7 is supplied through conductors 12 and 13. A remotely located manually operable switch 14, connected in the conductor 12, controls the operation of the solenoid valve 7.

Referring now to FIG. 5, the main valve 1 is of the pressure responsive, diaphragm type and comprises a body 20, a cover 21 and a flexible diaphragm 22 disposed intermediate said body and cover. The body 20 is provided with an inlet chamber 23 an an outlet chamber 24 separated by a partition including an upright wall 25 and a downwardly extending wall 26 which merge into a horizontal portion having a valve seat 27. The seat 27 has radial arms 28, which merge centrally and provide a guide 29 for the lower end of a valve stem 30. The upper end of the valve stem 30 is guided in a bearing 31 mounted in the cover 21.

The valve stem 30 extends through a central opening in the diaphragm 22 and carries a circular supporting plate 33 which engages a portion of the upper surface of the diaphragm 22, and also carries a lower diaphragm supporting member 34 which engages a portion of the lower side of said diaphragm. The member 34 has an inwardly projecting flange 35 at its lower side provided with an annular recess 36 in which a sealing ring 37 is seated. This ring engages the upper surface of the seat 27 when the valve is closed to prevent all flow between the inlet chamber 23 and the outlet chamber 24.

A disc 38 holds the sealing ring 37 in position and also supports the member 34. The disc 38 is engaged with an enlargement 39 formed on the valve stem 30. A lock nut 40 mounted upon a threaded portion 32 of the valve stem 30, secures the upper plate 33, diaphragm 22, supporting member 34 and disc 38 in assembled relation on the valve stem.

The cover 21 is constructed to provide a pressure chamber 41 above the diaphragm 22 to receive fluid under pressure for effecting downward flexing of the diaphragm to cause the sealing ring 37 to engage with the seat 27 and thus close the main valve 1. The cover 21 and diaphragm 22 are secured to the valve body 20 by bolts 21ª. The valve stem assembly is spring-loaded by a compression spring 42 disposed in the chamber 41 between the support plate 33 and a shoulder 43 formed in the cover 21.

Referring to FIG. 7, the upper end portion of the stem 30 is reduced in diameter above the threads 32 and modified by grinding away diametrically opposite sides to form parallel flats 44 adjacent the threaded portion and gradually tapered portions 45 that diverge beyond the flats. The cutaway portions 44 and 45 cooperate with the bearing 31 to control the rate of flow of operating fluid into the chamber 41, to produce "dampening" that prevents surging action as the valve disc closely approaches the seat 27.

The upper end of the valve stem 30 has a threaded bore 46, in which is mounted an adapter 47, FIG. 5. A stem extension 48 is connected with the adapter 47 and extends upwardly through a valve position indicator assembly 49 mounted in a threaded opening 50 in the valve cover 21. A transparent sight tube 51 reveals the upper end of the indicator stem 48, wherefrom the position of the valve disc assembly relative to the seat 27 can be visually ascertained.

Figure 2:
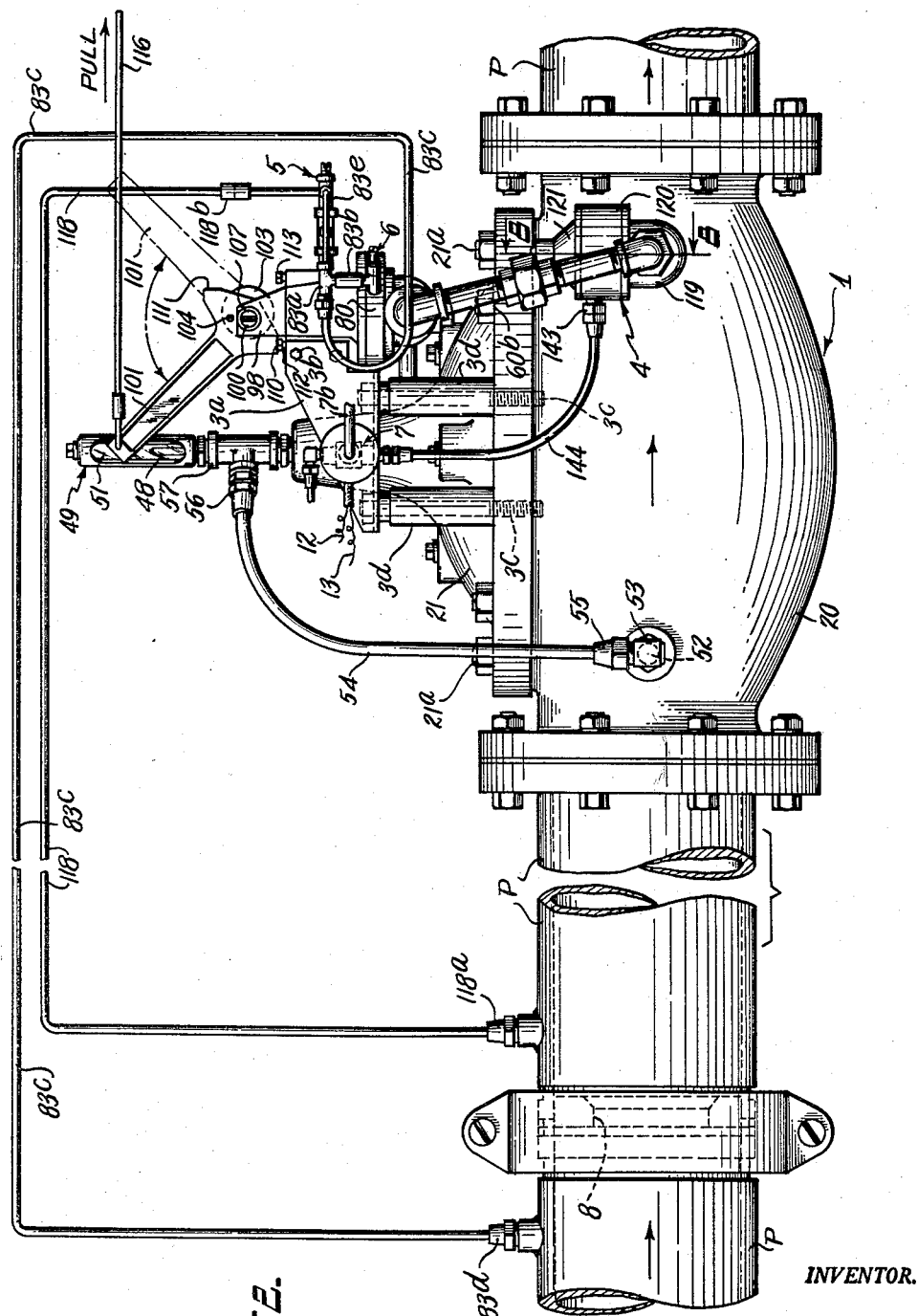
FIG. 2 is a side elevational view of the actual main valve and its control system.

Referring to FIG. 2, the valve body 20 has a threaded opening 52, communicating with the inlet chamber 23, in which a conventional strainer 53 is mounted. A conduit 54 is connected at one end to the strainer 53 by a fitting 55, and its other end is connected by a fitting 56, with a pipe-T 57 comprising an element of the valve stem position indicator 49. The pipe-T 57 communicates with the enclosed space in the cover 21 above the bearing 31, FIG. 5, so that operating fluid from the inlet chamber 23 of the main valve 1 can flow through the conduit 54 into said space, and through the flow channel between the bearing 31 and the relieved portions 44 and 45 of valve stem 30, into the pressure chamber 41. The flow channel between the relieved stem portions 44 and 45 and the bearing 31, as is evident, varies in transverse cross-sectional area as the stem 30 moves vertically.

The details of the combined manual and pressure-differential-operated control valve 3 are shown in FIGS. 9–13, inclusive. Referring particularly to FIG. 9, the valve 3 comprises a body 58 having a threaded inlet opening 59, a threaded outlet opening 60 and a partition 61 therebetween. The partition 61 has a threaded opening 62 in which a seat 63 is mounted. The seat 63 is generally cylindrical and its lower end is reduced in diameter and tapered on an angle of about 30°, as indicated at 64. The extreme lower end of the seat has a rounded edge 65. A threaded opening 66, concentric with the valve seat opening 62, has a hollow plug 67 mounted therein. An elongated valve disc element 68 is positioned below the valve seat 63 and is slidably mounted in the plug 67. A compression spring 69 has its upper end received in a bore 70 in the valve disc 68.

The portion of the valve disc 68 above the bore 70 is drilled to provide four circular openings 71, best shown in FIG. 12. An angular flange 72 projects laterally from the upper end of the valve disc 68 and cooperates therewith to form a groove 73 for an O-ring 74. The upper edge of the flange 72 is crimped inwardly, as indicated at 75, to retain the O-ring 74 in the groove 73. As is shown on an enlarged scale in FIG. 13, the rounded edge 65 of the seat 63 engages the O-ring 74 at the medial portion thereof.

It will be noted from FIG. 9 that the internal diameter of the valve seat 63 is equal to the external diameter of the valve element 68, so that fluid under pressure can always flow through the openings 71 into the plug 67 to substantially balance the pressures acting on the valve disc 68. Thus, line pressure which would otherwise act on the valve disc 68 and tend to move it to open position is nullified by the presence of the holes 71. A sealing ring 76 mounted in the plug 67 in surrounding relation to the disc 68, prevents leakage of pressure fluid along the outside of the body of the disc. The spring 69 normally urges the valve element 68 toward the seat 63, but undue pressure on the O-ring 74 is avoided when the valve 3 is closed, through the engagement of a rod 77 with the central portion of the valve disc 68, in a manner described hereinafter.

The upper portion of the valve body 58 of the control valve 3 is counterbored at 78 to receive a corresponding boss 79 formed upon the lower face of an intermediate body section 80. A vent opening 81 in the valve section 80 is closed at its outer end by a screw 82. A threaded opening 83, formed in another portion of the body section 80, has one leg of the "dampening" needle valve 6 mounted therein. The other leg of the valve 6 is connected with the stem of a pipe-T 83ª, FIG. 2, by a conduit 83ᵇ. One end of a conduit 83ᶜ is connected to one end of the pipe-T 83ª and its opposite end is connected at 83ᵈ to the pipe P, on the high pressure side of the orifice plate 8. The opposite end of the pipe-T 83ª is connected by a conduit 83ᵉ FIG. 3, with the lateral leg of the "trim" valve 5. The rod 77, which depresses the valve disc 68, is slideably mounted in an axial opening 84 in the body section 80.

A flexible diaphragm 85 is disposed between the body section 80 and the cover 86 of the control valve 3. A plurality of bolts 87 secure the valve body 58, body section 80, diaphragm 85 and cover 86 in assembled relation. The diaphragm 85 is supported by plates 88 and 89 at the opposite sides thereof, with the support plate 88 having a stem 90 that extends through the diaphragm 85 and the support plate 89 and is riveted-over to secure the parts in assembled relation. The body section 80 is centrally recessed to receive the lower support plate 88 and has a depression surrounding said recess providing a pressure chamber 91 at the lower side of the diaphragm 85. The cover 86 provides a pressure chamber 92 above the diaphragm 85. A plunger 93 is slideably mounted in a boss 94 projecting into the chamber 92. The lower end of the plunger 93 is conical and seated in a flanged washer 95 that forms an abutment for one end of a compression spring 96, the lower end of which engages the diaphragm support plate 89. The spring 96 continuously urges the support plate 88 into engagement with the upper end of the valve actuating rod 77. A sealing ring 97 mounted on the plunger 93 prevents leakage from the chamber 92 along said plunger.

The cover 86 has spaced ears 98 on its upper end, FIGS. 9 and 11, provided with aligned openings 99, which rotatably receive a shaft 100. A valve operating lever 101 is secured to the shaft 100 by a pin 100ª, and has a cavity 102 for a cam 103 eccentrically mounted on the same shaft. A pin 104 extends through the lever 101 and cam 103 and secures said cam to said lever. The periphery of the cam 103 contacts a nylon follower 105 mounted in the upper end of the plunger 93.

The opposite ends of the shaft 100 are diametrically slotted, as indicated at 106, FIG. 11. One end of a torsion spring 107 is received in each slot and its opposite end is received in an opening 108 in an ear 98. A pin 109 extends across the slot 106 at each end of the shaft 100 and retains the springs 107 in place on said shaft.

The valve operating lever 101 has abutment surfaces 110 and 111 located outwardly of the opposite sides of the cavity 102 and disposed on an angle of about 90° to each other. The abutment surfaces 110 and 111, respectively, engage adjustable stops 112 and 113, in the form of cap screws, that are mounted in threaded bores 114 and 115, respectively, projecting into the cover 86 at points located outwardly of the pressure chamber 92.

The torsion springs 107 rotate the shaft 100 in a counterclockwise direction, as viewed in FIG. 9, to engage the abutment surface 110 of the lever 101 with the stop 112. This position of the lever 101 corresponds to the closed position of the valve 3, which in turn, corresponds to the closed position of the main valve 1, as will appear more fully hereinafter. The lever 101 is manually operable and may be actuated from a point remote from the valve 3 by a lanyard 116, FIGS. 1 and 2, connected with the free end of said lever.

Figure 3:
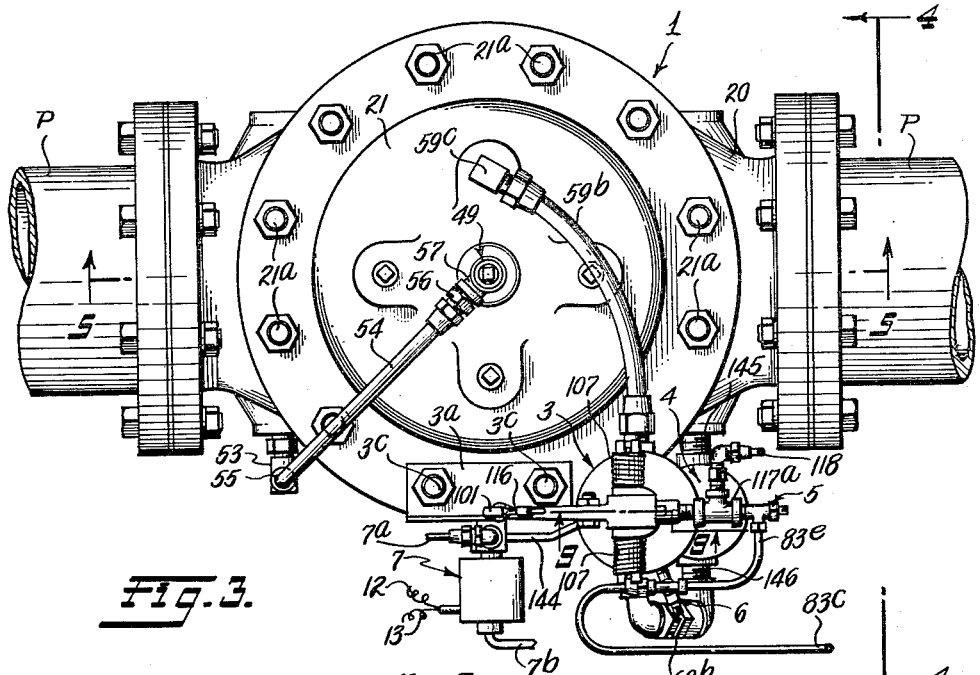
FIG. 3 is a plan view of the main valve and control means shown in FIG. 2.

A threaded opening 117, FIG. 9, communicates with the chamber 92 in the cover 86 and has one end of a pipe-T 117ª, FIG. 3, connected therewith. The needle valve 5 is mounted in the other end of said pipe-T. One end of a conduit 118 is connected with the stem of the pipe-T 117ª and its opposite end is connected at 118ª with the pipe P on the low pressure side of the orifice plate 8. An orifice fitting 118ᵇ is connected in the conduit 118 in advance of the valve 5 to restrict the pressure that can be communicated to the chamber 92 of the control valve 3.

It will be understood from the foregoing description that the lower side of the diaphragm 85 is subjected to the pressure at the high pressure side of the orifice plate 8 as communicated to the chamber 91 through the conduit 83ᶜ, and that the upper side of said diaphragm is subjected to the pressure at the low pressure side of said orifice plate as communicated to the pressure chamber 92 through the conduit 118. Thus, the diaphragm 85 is responsive to the pressure differential across the sensing point at the orifice plate 8. The function of the differential pressure will be explained later.

The bleeder-control valve 4 is shown in cross-section in FIG. 8 and comprises a main body 119, a body section 120 and a cover 121. A gasket 122 is disposed between the main body 119 and the body section 120, and a flexible diaphragm 123 is disposed between the cover 121 and the body section 120. The main body 119, gasket 122, body section 120, diaphragm 123, and cover 121 are secured in assembled relation by a plurality of stud bolts 124.

The valve body 119 has a threaded inlet opening 125 and a threaded outlet opening 126 separated by a partition 127. A seat 128 is formed on the partition 127 in surrounding relation to a passage 129. A valve stem 130 is slideably mounted in a central opening 131 in the body section 120. A valve disc assembly 132 is secured to the lower end of the valve stem 130. An O-ring 133 is mounted in the body section 120 and engages the valve stem 130 to form a seal therewith.

The upper portion of the body section 120 is recessed to provide a pressure chamber 134 at the lower side of the diaphragm 123. A diaphragm supporting plate 135 engages the lower side of the diaphragm 123 and is received in the chamber 134. A diaphragm supporting plate 136 engages the upper side of the diaphragm 123 and is received in chamber 137 in the cover 121. The supporting plates 135 and 136, and the diaphragm 123, are secured to a reduced end of the valve stem 130 by a nut 138. A compression spring 139 is disposed in the chamber 137 between the cover 121 and the plate 136 and normally tends to urge the valve stem 130 downwardly to maintain the valve 4 closed. A threaded opening 140, communicating with the chamber 134, serves as a vent opening and is closed by a plug 141. A similar threaded opening 142 has a conventional fitting 143 mounted therein to which one end of a conduit 144 is connected, the opposite end of said conduit being connected with one side of the three-way solenoid operated valve 7. The opposite side of the solenoid valve 7 is connected with a conduit 7ª for supplying air under pressure thereto. A conduit 7ᵇ is connected with the exhaust port of the solenoid valve 7. If desired, the conduit 7ª may be connected with the inlet chamber 23 of the main valve 1 and thus receive operating fluid under line pressure in the pipe P. In such case, the exhaust conduit would be connected with the outlet chamber 24 of the main valve 1, instead of opening to the atmosphere.

Figure 4:
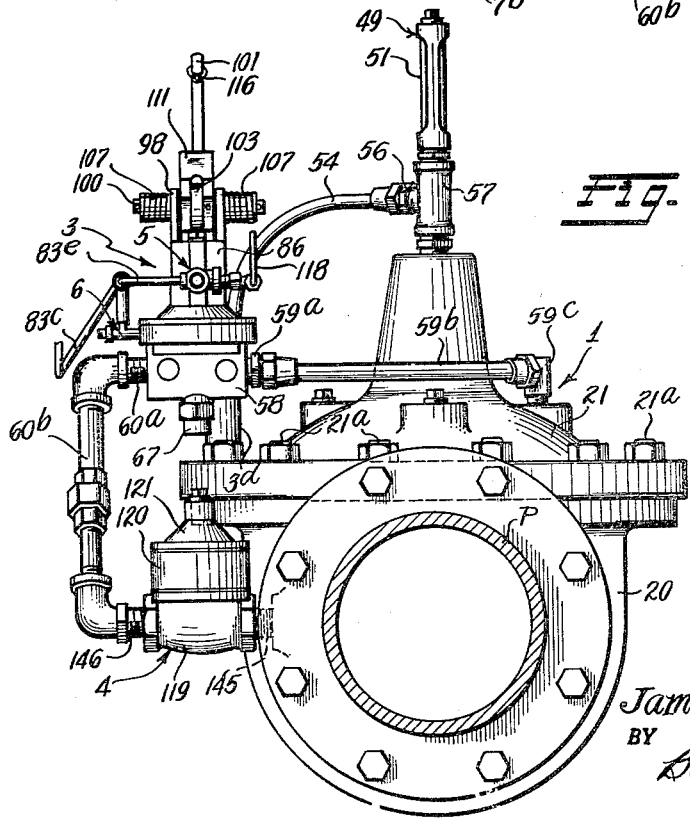
FIG. 4 is a right end view of the main valve and control means, as viewed on the line 4—4 of FIG. 3.

A pipe nipple 145, FIGS. 4 and 8, is threaded into the opening 126 in the valve 4 and the outlet thereof with a threaded opening 20ª in the valve body 20 to mount the bleeder valve 4 directly on the main valve 1 in communication with the outlet chamber 24.

A pipe nipple 146 is mounted in the threaded inlet opening 125 of the valve 4 and a similar nipple 60ª, FIG. 9, is mounted in the outlet opening 60 of the valve 3. The pipe nipples 146 and 60ª are interconnected by pipe means 60ᵇ, as shown in FIGS. 2 and 4, whereby the control valves 3 and 4 are interconnected in series-flow relation.

A conventional fitting 59ª, FIGS. 3, 4 and 9 is mounted in the inlet 59 of the control valve 3 and one end of a conduit 59ᵇ is connected thereto. A similar fitting 59ᶜ is mounted on the cover 21 of the main valve 1 and communicates with the pressure chamber 41. The opposite end of the conduit 59ᵇ is connected to the fitting 59ᶜ. The control valve 3 is thus connected in constant communication with the main diaphragm chamber 41.

The control valve 3 is secured to a bracket 3ª by bolts 3ᵇ. The bracket 3ª is mounted on the main valve 1 by stud bolts 3ᶜ passing through the spacers 3ᵈ and into threaded openings in the valve body 20. The bracket 3ª also serves as a mounting for the solenoid valve 7.

In the operation of the main valve 1 and the control system associated therewith, the main valve may be opened, closed or modulated by varying the pressure of the operating fluid in the diaphragm chamber 41. All of the foregoing can be effected by bleeding off more or less of the operating fluid supplied to the chamber 41. Thus, operating fluid under pressure normally flows from the inlet chamber 23 of the main valve 1 through the conduit 54 into the upper portion of the valve cover 21, then through the bearing 31 along the valve stem 30 and into the chamber 41 to flex the diaphragm 22 downwardly to close the main valve. The main valve 1 will remain closed until the pressure in the chamber 41 is relieved by the control means.

In order to open the main valve 1, the 3-way solenoid valve 7 must be energized by closing the switch 14, thereby permitting fluid pressure to be admitted through the conduit 144 into the chamber 134 of the bleeder valve 4 to flex the diaphragm 123 upwardly and thereby open said valve by raising the valve disc assembly 132 off its seat 128. This places the control valve 3 in direct command of the main valve 1. With the control lever 101 at its closed position, i.e., with the abutment 110 engaged with the stop 112, the valve 3 remains closed and the flow of operating fluid through the control valve 3 is prevented. Full inlet pressure from the main valve is then directed into the diaphragm chamber 41, and the main valve 1 remains closed.

When the abutment 110 of the control lever 101 is moved off its stop 112, as by pulling on the lanyard 116, the control valve 3 is caused to open, permitting flow of operating fluid from the diaphragm chamber 41, through conduit 59ᵇ, valve 3, conduit 60ᵇ, bleeder valve 4 and pipe nipple 145, into outlet chamber 24 of the main valve 1.

The opening of the control valve 3 is effected as follows: When the lever 101 is actuated by the lanyard 116, the cam 103 connected with said lever forces the plunger 93 downwardly, compressing the spring 96. When this spring load is greater than the load imposed by the spring 69, the plate 88 will move the rod 77 downwardly to unseat the valve disc 68, whereby the valve 3 will be opened. The draining of operating fluid from the chamber 41 will then allow the main valve 1 to open under line pressure. The rate of exhaust of operating fluid from the chamber 41 will increase as the control lever 101 is moved away from the stop 112 and effects corresponding wider opening of the control valve 3.

In order to manually effect full opening of the main valve 1, the lanyard 116 is pulled to further rotate the control lever 101 to its fully opened position with the abutment surface 111 engaged with the stop 113. Such rotation of the lever 101 causes the cam 103 to move the plunger 93 farther downwardly and causes the rod rod 77 to depress the valve disc 68 to its wide open position. The flow capacity through the control valve 3 at this time is greater than the maximum rate of flow of operating fluid into the chamber 41 of the main valve 1. Consequently, operating fluid will be unable to build up closing pressure in the chamber 41 and the main valve 1 will be controlled to provide maximum flow therethrough.

Should it be desired to decrease the rate of flow, the pull on the lanyard 116 is relaxed, permitting the springs 107 to return the lever 101 counterclockwise to reduce the force of the pin 77 acting on the valve disc 68, whereby allowing said valve disc to move toward its seat 65 to restrict the rate of flow of operating fluid through the valve 3 and cause pressure to build up in the chamber 41. The main valve 1 will then modulate to reduce the flow.

The same operating result will be obtained by an increase in the differential pressure across the orifice plate 8, inasmuch as a reduction in the fluid pressure acting in the low pressure chamber 92 will permit the pressure in the high pressure chamber 91 at the lower side of the diaphragm 85 to compress the spring 96, thus relieving the force acting on the valve actuating rod 77. In either event, the closing action of the valve 3 will restrict the rate of flow of operating fluid from the main diaphragm chamber 41, causing it to accumulate in said chamber and act on the diaphragm 22, urging the main valve toward closing position. Modulation of the main valve 1 thus takes place. Complete release of the lanyard 116 will permit the lever 101 to be returned to its closed position by the springs 107, with the result that the control valve 3 will close and prevent operating fluid from flowing out of the chamber 41, causing the main valve to close.

During the closing movement of the main valve 1, all operating fluid must pass through the bearing 31 and around the valve stem 30 in order to enter the chamber 41. The tapered flats 45 on the valve stem provide a gradual increase in the restriction of fluid flow past the stem as the valve disc assembly approaches the seat 27, thereby producing a damping action avoiding closing surges.

At low flow rates through the main valve 1, the differential pressure across the orifice plate 8 is too low to be effective upon the control diaphragm 85. These low flow rates may occur during "topping off" a tank truck to fill it to capacity during the dispensing of the last few gallons required to fill the tank. Under these low flow conditions, the control valve 3 responds only to the position of the control lever 101. The main valve 1 will then respond directly to the condition of the control valve 3 as reflected by the position of the lever 101. The main valve is held in position and prevented from drifting at these low flow rates by the operation of the stem 30 in the bearing 31. If the flow through the bearing 31 into chamber 41 does not equal the fluid flow through the control 3, the diaphragm 22 is urged to a new position. As this occurs the flow into the chamber 41 is changed due to the metering effect of the tapered flats 45 on the stem 30 as it moves in the bearing 31. This change of flow into the chamber 41 continues until the flow through the bearing 31 is equal to the flow out through control 3, whereupon the main valve 1 holds this position, unless the control 3 is re-positioned by the control lever 101. In addition to the precise control effected by the lever 101, the valve stem 30 of the main valve 1 functions to counteract the tendency of the movement of the diaphragm assembly to accelerate just before the disc contacts its seat, thereby avoiding pressure surges as explained above.

Further, with respect to the operation of the control valve 3, the high and low pressure sensing chambers 91 and 92, respectively, on opposite sides of the diaphragm 85, are subject to the pressure across orifice plate 8, as previously explained. As the main valve 1 is permitted to open as a result of the lanyard movement, flow across or through the orifice 8 creates a differential pressure that tends to cancel out the force of the upper spring 96 and modulates the differential control valve opening in proportion to the differential pressure. As the opening of the control valve 3 is reduced, the volume of flow of operating fluid out of the cover chamber 41 of the main valve 1 is less than the volume of flow into the cover chamber 41, so that the main valve 1 throttles or modulates. Throttling of the main valve 1 reduces the rate of liquid flow therethrough and, in turn, reduces the differential pressure across the control diaphragm 85 sensed from the orifice plate 8. A condition of equilibrium between the control spring forces and differential pressure force at the diaphragm 85 is thus reached. Whenever the flow in the pipeline P increases or decreases, the unbalance in the forces between the springs 69 and 96, and diaphragm 85 occurs. Flow through the control valve 3 is automatically adjusted to the new conditon and modulates the main valve 1 to hold the flow at the desired level determined by the position of lever 101.

The pressure at the orifice plate 8 may vary, if during during the loading operation other demands are made on the pipline P upstream of the main valve 1. In such case, a pressure drop will occur at the inlet or high pressure side of the orifice plate 8 and reduce the pressure differential across the control diaphragm 85. The control valve 3 will then tend to open for greater flow of operating fluid therethrough. The pressure in the main diaphragm chamber 41 is then reduced and the main valve 1 will open wider to maintain the desired flow rate, notwithstanding the disturbance created by other demands on the pipeline P.

The pressure changes at the orifice plate 8, as noted above, automatically adjust the flow rate to that set initially by the lever 101. The lanyard 116 and lever 101, therefore, need not be moved to compensate for upstream pressure changes.

It will be understood that the stops 112 and 113 on the cover of the control valve 3 may be adjusted as desired. However, the stop 110 is adjusted so that when the lever 101 is in the closed position illustrated in FIG. 9, the valve disc 68 assumes a position to just close the control valve 3. This prevents the full load of the lower spring 69 from tending to press and deform the sealing member 74 against the end 65 of the valve seat 63 when the valve 3 is out of service. When such adjustment has been made, the lever 101 requires a minimum of clockwise movement to start opening of the control valve 3.

The wide-open stop 113 limits the degree of opening of the valve 3, or in other words, the amount of movement of the valve element 68 away from the seat 63. The stop 113 also performs another function in that the maximum rate of flow through the main valve 1 under control of the lever 101 is reduced if the stop 113 is adjusted to limit the lever movement to a shorter stroke. Hence, the stop 113 can be adjusted so that the maximum flow through the main valve 1 is limited to protect any equipment associated therewith from over-ranging, thereby precluding damage that might occur, for example, to a meter connected in the pipeline P.

Again, if the sensing differential pressure is too high, the rate of flow will require adjustment of the "trim" valve 5. The differential produced across the orifice plate 8 may be too high to allow the desired maximum flow rate, overriding the maximum flow rate set by the lever stop 113 on the control valve 3. To reduce the differential pressure under such condition and still obtain the desired maximum flow rate, the "trim" valve 5 is opened. This permits a certain portion of the differential pressure produced across the orifice plate 8 to be bled back to the low pressure side of said orifice plate. The "trim" valve 5 adjustment will, therefore, compensate for the undesired action on the control valve 3 caused by the excess differential pressure across the orifice plate 8.

Due to the size and length of the sensing lines 83c and 118, in certain installations, pulsations may occur. Adjustment of the "dampening" valve 6 can be made to eliminate such pulsations to assure smooth control.

It will thus be seen that the present valve and control therefor provide for great flexibility in the adjustment and operation of the main valve 1, and also for ready and convenient control by relatively unskilled persons. It will also be understood that the main valve 1 can be closed at any time by opening the switch 14 to de-energize the solenoid valve 7. Such de-energization will effect exhaust of operating fluid from the diaphragm chamber 134 of the bleeder valve 4 through the exhaust conduit 7b, thereby allowing the spring 139 to close the valve 4 and block flow of operating fluid from the main diaphragm chamber 41 to effect closing of the main valve 1.

While the main valve 1 has been shown and described with a particular control system, including specific types of valves, it will be understood that variations may be made in the types and details of the valves employed in the control system without departing from the principles of the invention or the scope of the annexed claims.

I claim:

1. In combination, a main valve having a pressure chamber and means operable in response to the pressure of operating fluid in said pressure chamber for controlling flow through said main valve; and control means for said main valve comprising a first control valve; a second control valve; conduit means connecting said control valves in series, and with said main valve to exhaust operating fluid from said pressure chamber, said first control valve being located between said pressure chamber and said second control valve, said first control valve including normally manually operated means for controlling opening and closing thereof to control the flow of operating fluid from said pressure chamber; and means independent of said manually operable means connected with said second control valve and controlling opening and closing thereof to control the flow of said operating fluid beyond said first control valve.

2. The combination defined in claim 1, in which the first control valve includes manually operable means controlling opening and closing thereof, and flow rate therethrough, and wherein the main valve has a bearing above its pressure chamber and an inlet for operating fluid above said bearing, and a stem is vertically slideable in said bearing, said stem being tapered in the zone of said bearing and gradually increasing in area in a direction away from said pressure chamber, to decrease the flow rate of operating fluid, as the stem moves downwardly, whereby when said flow rate equals the flow rate through said first control valve, the main valve will hold its position.

3. The combination defined in claim 2, in which the manually operable means comprises a valve control lever, and a lanyard connected with said lever for actuating the same from a remote point.

4. The combination defined in claim 2, in which the first control valve also includes means responsive to differential fluid pressure at a sensing point remote from the main valve for maintaining a uniform rate of flow through said main valve.

5. The combination defined in claim 1, in which the first control valve includes a valve disc controlling flow therethrough; said normally manually operated means including an element engaged with said valve disc to actuate the same; and pressure differential responsive means acting conjointly with said manually operable means to control said valve disc.

6. The combination defined in claim 1, in which the control means for the second control valve includes a switch.

7. The combination defined in claim 1, in which the second control valve is fluid pressure responsive and the control means therefor includes a solenoid-operated valve controlling the supply and exhaust of operating fluid thereto.

8. The combination defined in claim 1, wherein the first control valve includes a valve disc and means including a diaphragm having pressure chambers on the opposite sides thereof for actuating said valve disc, and wherein means are provided for communicating to said pressure chambers, the differential pressure at a sensing point remote of said main valve.

9. In combination, a main valve having a pressure chamber and means operable in response to the pressure of operating fluid in said pressure chamber for controlling flow through said main valve; and control means for said main valve comprising, a first control valve; a second control valve; conduit means connecting said control valves in series, and with said main valve to exhaust operating fluid from said pressure chamber, said first control valve being located between said pressure chamber and said second control valve; means, including a normally manually operated means, controlling opening and closing of said first control valve to control the flow of operating fluid from said pressure chamber; and means independent of said control means for said first control valve controlling opening and closing of said second control valve to control the flow of said operating fluid beyond said first control valve.

10. In combination, a main valve having an inlet chamber, an outlet chamber, a pressure chamber and means operable in response to the pressure of operating fluid in said pressure chamber for controlling flow from said inlet chamber into said outlet chamber; and control means for said main valve comprising, a first control valve; a second control valve; conduit means connecting said control valves in series, and with said main valve to exhaust operating fluid from said pressure chamber and discharge the same into said outlet chamber, said first control valve being located between said pressure chamber and said second control valve, said first control valve including normally manually operated means for controlling opening and closing thereof to control the flow of operating fluid from said pressure chamber; and means independent of said manually operable means connected with said second control valve and controlling opening and closing thereof to control the flow of said operating fluid from said first control valve to the outlet chamber of said main valve.

11. In combination, a main valve having an inlet, an outlet and means between said inlet and outlet controlling flow through said valve, said main valve also having a diaphragm and a pressure chamber at one side of said diaphragm for actuating said flow control means; a first conduit connecting said inlet with said diaphragm chamber for supplying operating fluid thereto; and a control system for said main valve including a second conduit connecting said pressure chamber with said outlet; a first control valve and a second control valve connected in series in said second conduit for controlling the exhaust of operating fluid from said pressure chamber and the return thereof to the outlet of said main valve, said first control valve including normally manually operated means for effecting opening and closing thereof, and said second control valve including fluid pressure responsive means for controlling the flow therethrough; means connected with said normally manually operated means of said first control valve for operating the same from a remote point; a three-way solenoid-operated valve connected with and controlling the supply and exhaust of operating fluid to said second control valve; and means connected with said solenoid-operated valve for actuating the same from a remote point.

12. The combination defined in claim 11, in which the first control valve includes pressure-responsive means for actuating the same in accordance with a pressure differential; and wherein conduit means is connected with said first control valve for communicating thereto the differential pressure at a selected sensing point remote from the main valve.

13. The combination defined in claim 12 in which high and low pressure conduits, respectively, communicate the differential pressure at the sensing point to said first control valve, and wherein each of said conduits has a needle valve connected therewith.

14. The combination as defined in claim 13, wherein one of the needle valves is connected with the low pressure conduit and is adjustable to vary the differential pressure effective upon the pressure-responsive means of said first control valve.

15. The combination defined in claim 13, in which the needle valves are interconnected, and wherein the needle valve connected with the high pressure conduit is adjustable to dampen out pulsations.

16. A main valve having a pressure chamber for operating fluid and means subject to said pressure for controlling fluid flow through said main valve; and control means for said main valve comprising a first combined manual and differential pressure-responsive control valve; a second pressure-responsive control valve; conduit means connecting said control valves in series, and with said pressure chamber for exhausing operating fluid from said pressure chamber, said first control valve including a manually operable lever carrying a cam and means actuatable by said cam for effecting opening and closing of said first control valve to control the flow of operating fluid from said pressure chamber; means normally biasing said lever in a direction for effecting closing of said first control valve; said first control valve also including a diaphragm and having pressure chambers on the opposite sides of said diaphragm, said diaphragm being operatively associated with said cam-operated means to simultaneously act thereon; means communicating with the pressure chambers of said first control valve for transmitting thereto the differential pressure at a selected sensing point remote from the main valve; means connected with said second control valve including a switch for controlling said solenoid-operated valve.

17. A main valve as defined in claim 16, in which a high pressure and a low pressure conduit serve to transmit the differential pressure to the pressure chambers on the opposite sides of the diaphragm, and wherein each of said conduits has a needle valve connected therewith, and wherein the needle valves are connected together, and wherein the needle valve connected with the low pressure conduit is adjustable to vary the differential pressure effective upon said diaphragm and wherein the needle valve connected with said high pressure conduit is adjustable to dampen pulsations therein.

18. A valve comprising a body having an inlet and an outlet, and having a seat between said inlet and outlet; a valve disc element axially aligned with said seat; means, including a resilient element, normally urging said valve element into engagement with said seat; a valve section connected with said valve body and having an opening aligned with the axis of said valve seat; a rod slideably mounted in said opening and having one end thereof in abutting engagement with said valve disc; a pressure-applying element engaging the opposite end of the said rod; means for manually imparting axial movement to said rod including a spring, and lever and cam means for applying compressive force to said spring; a diaphragm overlying said valve section and being connected with said pressure-applying element; and a cover enclosing said diaphragm and spring, said cover and said valve section providing pressure chambers on the opposite sides of said diaphragm, whereby said diaphragm can be operated in accordance with the differential in the pressures acting thereon in said pressure chambers.

19. A valve as defined in claim 18, wherein the lever is pivotally mounted on the cover and includes two abutment faces, and wherein two stop elements are mounted on the cover and are each engageable by one of said abutments for limiting the angular movement of said lever, the first of said stop elements being engaged by one of said abutments when the valve is fully closed and the second of said stop elements being engaged by the other of said abutments when the valve is wide open.

20. A valve as defined in claim 19, in which the first stop element is adjustable to limiting seating pressure of the valve, and wherein the second stop element is adjustable to vary the wide open position of the valve.

21. The combination defined in claim 9, in which the means operable in response to the pressure of operating fluid for controlling flow through the main valve includes: a diaphragm forming one wall of said pressure chamber; a stem connected with said diaphragm; means in said main valve guiding said valve stem, said stem including a portion extending through and slideable within said guide means, said main valve having an enclosed space above said guide means for receiving operating fluid under pressure, said guide means being disposed between said space and said pressure chamber; means communicating with said space for admitting operating fluid into said space, said stem having tapered means in its outer surface cooperating with said guide means for providing a flow channel between said space and said pressure chamber, which flow channel varies in transverse cross-sectional area as said stem move with said diaphragm within said guide means to thereby control the rate of flow of operating fluid from said space into said pressure chamber to vary the closing rate of said main valve.

22. A valve, comprising: a body having an inlet, an outlet, and a seat between said inlet and outlet; a cover; a diaphragm between said body and said cover, and forming with said cover a pressure chamber; a stem connected with said diaphragm and having a flow control element at one end thereof which is movable toward and away from said seat for controlling the rate of flow from said inlet to said outlet; a bearing in said cover, said stem including a portion extending through said bearing, said cover having a space above said bearing and separated from said body inlet for receiving operating fluid under pressure, said stem having tapered means on its outer surface on the portion which extends through said bearing and which defines therewith a flow channel between said space and said pressure chamber, the transverse cross-sectional area of said flow channel being varied to thereby vary the rate of flow of operating fluid from said space into said pressure chamber as said stem moves relative to said bearing and toward said valve seat, whereby to regulate the closing rate of said valve.

23. A valve as defined in claim 22, in which the tapered means includes tapered flat portions on opposite sides of the stem merging into parallel flat portions on said stem.

References Cited by the Examiner

UNITED STATES PATENTS

| | | | |
|---|---|---|---|
| 1,046,236 | 12/12 | Wagner | 251—35 |
| 1,302,538 | 5/19 | Gulick | 137—413 |
| 1,546,602 | 7/25 | Morrison | 251—263 XR |
| 1,987,032 | 1/35 | Spence | 137—495 XR |
| 2,474,355 | 6/49 | Griswold | 137—495 XR |
| 2,495,324 | 1/50 | Griswold | 137—497 |
| 2,605,479 | 8/52 | Ansorge | 251—251 XR |
| 2,642,083 | 6/53 | Strong | 251—263 XR |
| 2,820,357 | 1/58 | Henrici | 251—30 XR |
| 2,830,784 | 4/58 | Placette | 251—263 XR |
| 2,871,995 | 2/59 | Cline | 137—522 XR |
| 2,888,032 | 5/59 | Griswold | 137—486 |
| 3,076,471 | 2/63 | Salerno | 251—35 X |

M. CARY NELSON, *Primary Examiner.*